INVENTORS
HARMON W. BROWN
RAYMOND A. ERICKSON

INVENTORS
HARMON W. BROWN
RAYMOND A. ERICKSON
BY
ATTORNEY

United States Patent Office 3,497,688
Patented Feb. 24, 1970

3,497,688
TOTAL ION CURRENT MONITORING ELECTRODE STRUCTURE FOR CYCLOIDAL MASS SPECTROMETERS
Harmon W. Brown, Los Altos, and Raymond A. Erickson, San Jose, Calif., assignors to Varian Associates, Palo Alto, Calif., a corporation of California
Filed May 2, 1967, Ser. No. 635,515
Int. Cl. H01j 39/34; B01d 59/44
U.S. Cl. 250—41.9                                           6 Claims

ABSTRACT OF THE DISCLOSURE

A total ion current monitoring electrode structure is disclosed for use in a cycloidal mass spectrometer. The mass spectrometer employs an ion source for ionizing a gaseous substance to be analyzed and for projecting the ions in a beam through a beam defining slit which shaves the ion beam to a predetermined thickness which, in one embodiment, is adjustable by adjusting the width of the beam defining slit. The ion beam is then projected through an array of mass analyzing electrodes. These electrodes are immersed in a magnetic field directed at right angles to a static electric field produced by the electrode structure to cause ions of a certain predetermined charge to mass ratio to execute a certain cycloidal trajectory and be focused through a detector slit, thereby mass analyzing the ions.

A total ion current beam monitoring electrode structure is disposed overlaying the end portions of the beam defining slit for intercepting a certain fixed percentage of the total ion current. The intercepted current is fed to an electrometer for giving a measure of the total ion beam current. Such a measurement is useful for setting leak rates into the spectrometer and for determining if sample material is being fed into the spectrometer.

In one embodiment, the beam defining slit is adjustable and necessitates placing the ion current monitoring electrode structure on the side of the slit which is toward the detector and, thus, downstream of the cycloidal ion trajectories. In this case, an electrical conductive shield electrode is placed over the current monitoring electrode to collect the low mass ions which have very tight cycloidal trajectories, and to conduct their charge away such as not to build up a potential which would otherwise interfere with the desired electric field.

DESCRIPTION OF THE PRIOR ART

Heretofore, total ion current monitoring electrodes have been employed in mass spectrometers. However, these ion current monitoring electrodes had various shapes which would introduce non-uniformities in the electric field of a cycloidal mass spectrometer and, thus, were generally unsuited for use in a high resolution cycloidal mass spectrometer.

SUMMARY OF THE PRESENT INVENTION

The principal object of the present invention is the provision of an improved total ion current beam monitoring electrode structure for use in cycloidal mass spectrometers.

One feature of the present invention is the provision, in a cycloidal mass spectrometer, of a total ion beam current monitoring electrode which is disposed overlaying the opposite ends of an elongated ion beam defining slit, whereby a certain fraction of the ion beam current is intercepted without defocusing the beam.

Another feature of the present invention is the same as the preceding feature wherein the ion current monitoring electrode is contained within the interior of one of the electrodes of the mass analyzer, whereby the current monitoring electrode does not perturb the ion focusing electric fields of the mass analyzer.

Another feature of the present invention is the same as any one or more of the preceding features wherein the beam defining slit has one fixed and one adjustable beam defining member with the ion monitoring electrode being disposed over the fixed beam defining member.

Another feature of the present invention is the same as the preceding feature wherein the fixed beam defining member is disposed on the downstream side of the beam defining slit and includes the provision of a conductive shield disposed overlaying said ion monitoring electrode for collecting and dissipating the charge carried by certain low mass ions which would otherwise return to and be collected on the ion monitoring structure.

Other features and advantages of the present invention will become apparent upon a perusal of the following specification taken in connection with the accompanying drawings wherein:

DESCRIPTION OF THE PREFERRED EMBODIMENTS

Figures 1, 2:
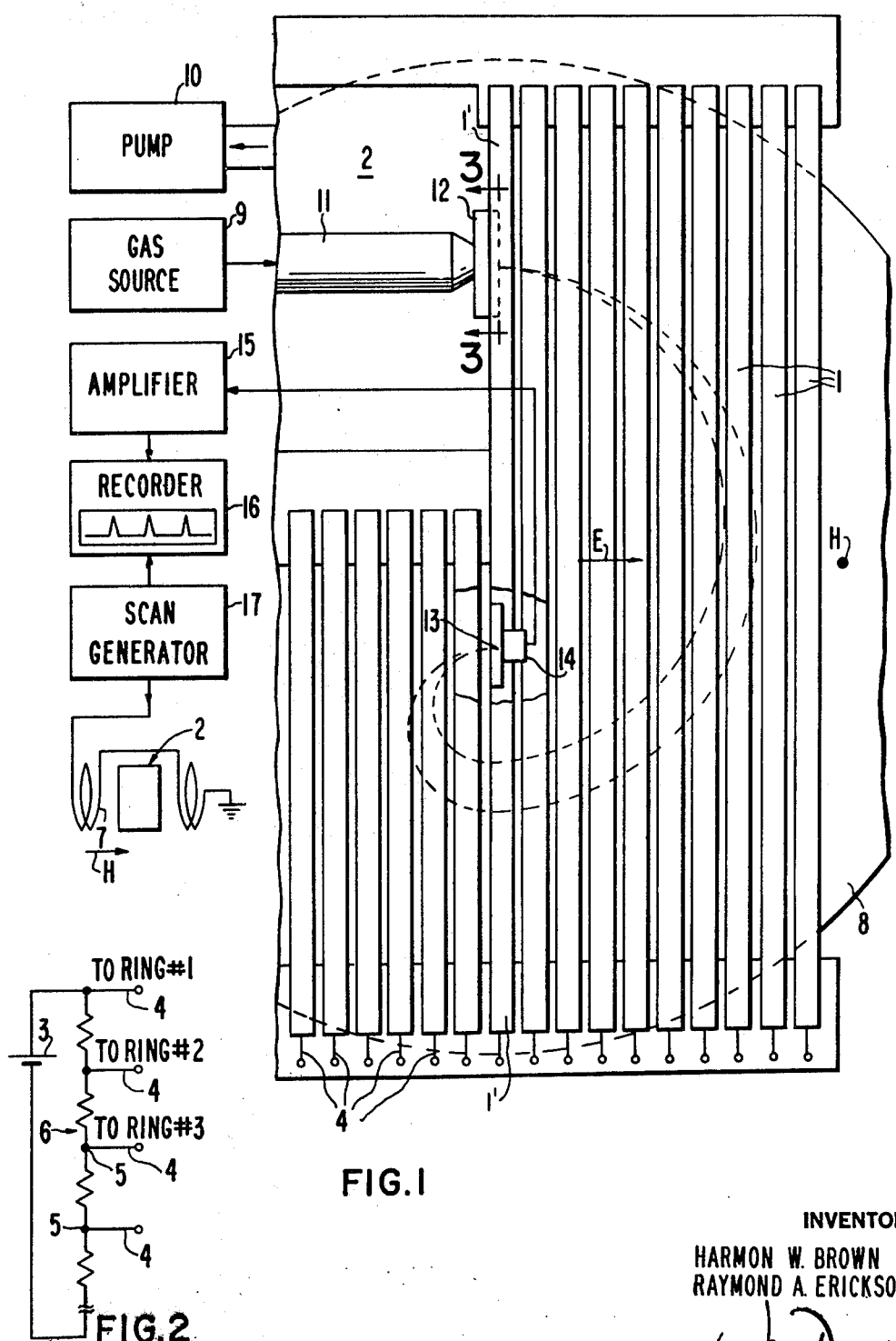
FIG. 1 is a fragmentary side elevational view, partly broken away and partly schematic, of a cycloidal mass spectrometer employing features of the present invention.
FIG. 2 is a circuit diagram of the voltage supply for the mass analyzer of the mass spectrometer of FIG. 1.

Referring now to FIG. 1 there is shown a cycloidal mass spectrometer system. More particularly, an array of generally rectangular shaped ring electrodes 1 are insulatively supported within a thin rectangular vacuum envelope 2, only partialy shown, from a heavy demountable rectangular flange portion of the envelope not shown, which closes off one end of the vacuum envelope 2.

The separate rings 1 of the electrode array are operated at slightly different electric potentials derived from a voltage source 3 (see FIG. 2) via leads 4 connected at nodes 5 of a voltage divider network 6. The different potentials applied to the different rings 1 establishes a region of uniform electric field E in the hollow interior of the ring electrode array. The electric field E is directed parallel to the line of development of the ring electrode array.

The electrode array is immersed in a uniform region of magnetic field H directed at right angles to the direction of the electric field E. The field H is conveniently produced by an electromagnet 7 with the vacuum envelope 2 being disposed in the narrow gap defined between a pair of pole pieces 8 of the magnet 7.

The envelope 2 is evacuated in use via pump 10 to a suitably low pressure as of $10^{-8}$ torr. Gas to be analyzed by the analyzer section, including the array of electrodes 1, is introduced from a source 9 into the mass analyzer section through the vacuum envelope 2 via an inlet tubing 11 as of stainless steel. The inlet tubing 11 feeds gas at a desired rate into an ion source 12. The ion source ionizes the gas and projects it through a slit into the crossed magnetic field H and electric field E of the mass analyzer.

Under the influence of the crossed electric and magnetic fields the ions are caused to execute cycloidal trajectories. However, only ions of a certain mass number, for a given intensity of E and H, will be focused at a detector slit 13 a certain focal distance from the source and at the same electric potential. An ion detector 14 is positioned behind the slit 13 to produce an output corresponding to number of ions under analysis having the certain predetermined focused mass number, if any.

The output is fed to an amplifier 15 which amplifies the detected signal and feeds it to the Y axis of an X–Y recorder 16 wherein it is recorded as a function of a scan of the magnetic field intensity H produced by a scan generator 17. The output of the recorder 16 is a mass spectrum of the sample under analysis.

Figure 3:
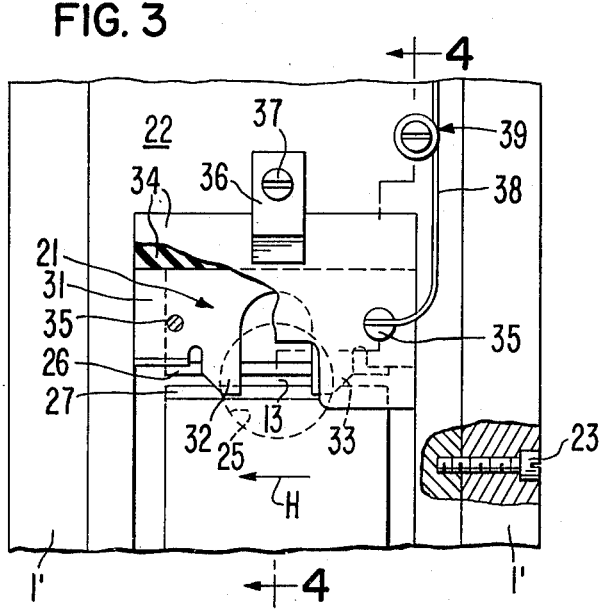
FIG. 3 is an enlarged plan view, partly broken away of the ion beam monitoring electrode structure of FIG. 1 taken along line 3—3 in the direction of the arrows.
Figure 4:
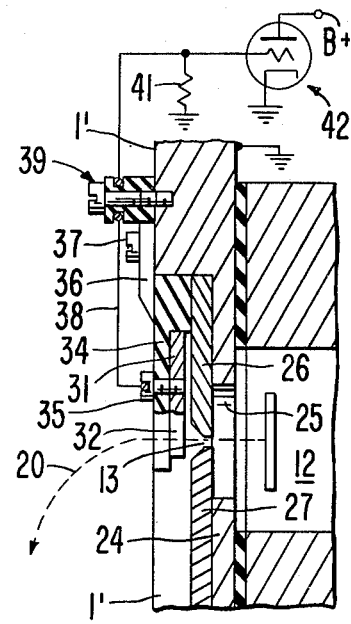
FIG. 4 is a sectional view of the structure of FIG. 3 taken along line 4—4 in the direction of the arrows.

Referring now to FIGS. 3 and 4 there is shown the ion beam defining slit 13 together with the total ion current monitoring electrode structure 21 of the present invention. The slit defining structure and ion current monitoring electrode structure 21 are designed to be thin in the direction of the electric field E such that both structures can be confined substantially entirely within the interior of the ring electrode 1'. In this manner, the uniformity of the electric field E in the vicinity of the ion beam 20 is least perturbed.

A plate structure 22 is mounted across the ring 1' via a plurality of screws 23 spaced around the ring 1'. The plate 22 is milled out to provide a relatively thin base plate portion 24 on which various elements are mounted. The base plate portion 24 is mounted over the ion source 12. A circular hole 25, as of 0.200" in diameter, is cut through the base plate portion 24 in registration with the ion source 12.

A pair of generally rectangular plates 26 and 27 are fixedly mounted to the base plate portion 24 via screws, not shown. The plates 26 and 27 extend over the hole 25 and are spaced apart along mutually opposed parallel side edge portions to form the long sides of the beam defining slit 13. The edge of the hole 25 defines the ends of the beam defining slit 13. The slit 13 is elongated in the direction of the magnetic field H and has a width, for example, of 0.002" to define a ribbon-shaped ion beam 20 which passes into the crossed E and H fields of the mass analyzer for mass analysis.

A plate-shaped ion collecting electrode 31 is disposed over beam defining plate 26 in insulative spaced relation therefrom. The ion collecting plate 31 has a pair of arm portions 32 and 33 which project from the plate 31 over the end portions of the beam defining slit 13. The projecting arms 32 and 33 each block off and intercept about 12% of the total ion current of the beam which has passed through the slit 13. An electrical insulating member 34 as of alumina ceramic, covers over the ion collecting electrode 31 and serves to support the ion collecting electrode 31 in spaced relation from the slit defining members 26 and 27 via screws 35. A clamping bar 36 clamps the insulator 34 in position. The clamping bar 36 is held by screw 37 to the plate 22.

An electrical lead 38 is connected to the insulated ion collecting plate 31 via screw 35 and the lead 38 is wrapped around an insulated binding post 39 and thence is connected to ground via resistor 41. The grid of an electrometer tube 42 is connected to amplify the ion current voltage drop produced across the resistor 41 to give an output proportional to the total ion current of the beam 20. A measure of the total ion current is useful in adjusting the leak rate of sample gas into the mass spectrometer and for indicating the presence of a sample gas.

One of the advantages of the ion current measuring electrode structure of FIG. 1 is that the two arm portions 32 and 33 of the ion collecting plate 31 are symmetrically disposed with respect to the ends of the beam defining slit 13 such that the ion beam is not defocused by electric fields associated with the ion collecting electrode 31. The ion collecting electrode 31 may operate at potentials ranging from 1 volt to 100 millivolts different than the ring electrode 1' in which it is disposed. Also, the ion collecting electrode 31 is thin in the direction of the ion beam 20 such that it is easily contained within the central region of the ring-shaped electrode 1' to prevent excessive perturbation of the uniform electric field E between rings 1.

Figure 5:
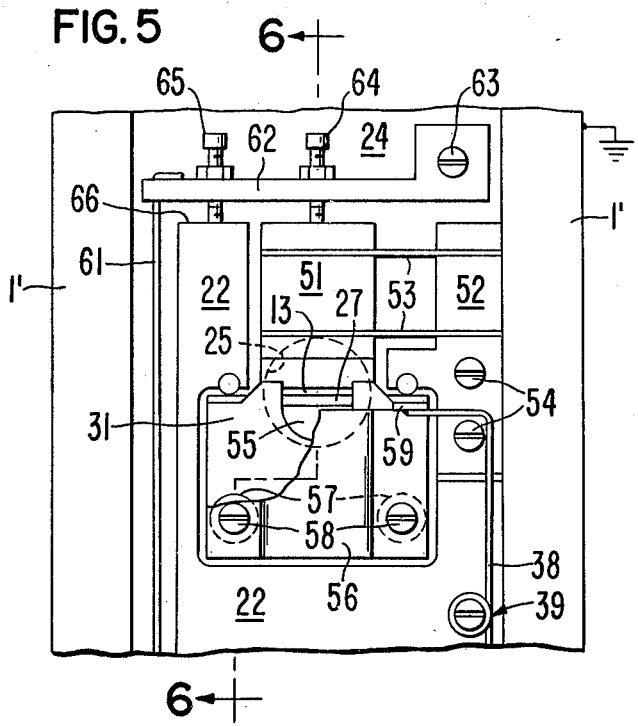
FIG. 5 is a view similar to that of FIG. 3 depicting an alternative ion monitoring electrode structure of the present invention.
Figure 6:
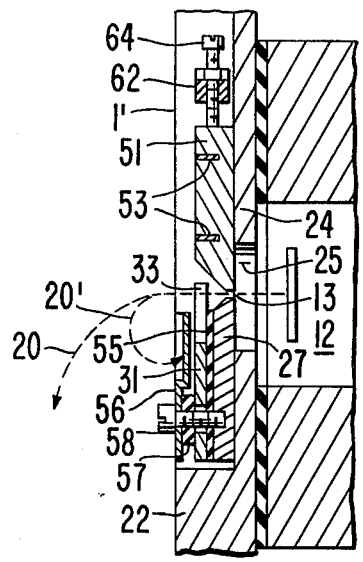
FIG. 6 is a sectional view of the structure of FIG. 5 taken along line 6—6 in the direction of the arrows.

Referring now to FIGS. 5 and 6 there is shown an alternative embodiment of the present invention. In this embodiment, the structure is similar to that of FIGS. 3 and 4 except that the beam defining slit 13 has its width electrically adjustable and the ion current monitoring electrode structure is disposed on the downstream side of the slit 13. More particularly, the beam defining slit 13 is defined by the space between plate 27 and a movable plate 51. The movable plate 51 is supported from a support plate 52 via the intermediary of a pair of leaf springs 53, as of tungsten rod 0.006" thick, 0.060" wide, and 0.5" long, which are fixedly secured at their ends to the movable plate 51 and to the fixed support structure 52. This type of spring support is described and claimed in copending U.S. patent application Ser. No. 635,516, filed May 2, 1967 and assigned to the same assignee as the present invention. The fixed support structure is affixed to the base plate portion 24 via a pair of screws 54.

The plate-shaped ion collecting electrode 31, with its pair of projecting arms 32 and 33, is disposed overlaying the fixed beam defining plate 27 with a thin sheet of insulation 55, as of mica, sandwiched therebetween. A conductive shield electrode 56 is disposed overlaying and covering over the ion collecting electrode 31 in spaced relation therefrom by a pair of insulative washers 57, as of sapphire. A pair of screws 58 hold the shield 56, insulators 57, ion collecting plate 31 and mica insulation to the fixed beam defining plate 27. A tab 59 is turned up from the edge of the ion collecting plate to form a terminal for making electrical connection to lead 38 which is wrapped around the insulated binding post 39 and thence fed to the electrometer tube 42 and resistor 41, not shown in FIGS. 5 and 6.

The arm portions 32 and 33 of the ion collecting plate function, as in the embodiment of FIGS. 3 and 4, to monitor the total ion current of the ion beam. However, in the embodiment of FIGS. 5 and 6, the ion collecting electrode is disposed on the downstream side of the beam defining slit 13 and as such the low mass ions are focused into tight cycloidal trajectories as indicated by dotted line 20'. Therefore low mass ions are returned to the grounded shield 56 which collects the ions and dissipates their charge. If there were no conductive shield electrode 56, as in the embodiment of FIGS. 3 and 4, then these returned ions would build up a charge on the insulator 34. This charge would develop a potential which would seriously perturb the uniformity of the electric field E in the mass analyzer region and degrade resolution of the mass spectrometer.

The electrical adjustable slit 13 is adjusted in width over a range from 0.0000" to 0.005" by means of a thermally expansive wire 61. The wire 61 is fixed to an insulative binding post, not shown, at one end and is fixed at its other end to a lever arm 62 pivoted about a pin 63. The support structure 52 is positioned such that the leaf spring support legs 53 spring bias the movable beam defining member 51 to a slit width greater than that of the maximum adjustable width, as of 0.005". A jack screw 64 is threaded through the lever arm 62 and bears against the end of the movable slit defining member 51. Thus, the spring bias force is transmitted from the movable slit defining member 51 to the wire 61 to put the wire in tension. The jack screw 64 is set such that at ambient temperature of the wire 61 the slit 13 is adjusted for its narrowest operating position to obtain highest mass resolution. As the heating current is increased through the wire 61, it is heated to expand and, thus, to permit the spring bias force to open up the width of the beam defining slit 13. A second jack screw 65 is threaded through the lever arm 62 and bears against a shoulder 66 of the plate 22 to provide a limit stop to prevent the wire 61 from closing the slit 13 below a certain predetermined width.

In both the embodiments of FIGS. 3–6, the metal parts of the structures are made of 304 non-magnetic stainless steel, except for the springs 53 which are made of tungsten.

Since many changes could be made in the above construction and many apparently widely different embodiments of this invention can be made without departing from the scope thereof it is intended that all matter contained in the above description or shown in the accompanying drawings shall be interpreted as illustrative and not in a limiting sense.

What is claimed is:

1. In a cycloidal mass spectrometer, means for ionizing gaseous substances to be analyzed and for projecting the ions through a beam defining slit to form a ribbon-shaped beam, means forming an array of ring-shaped electrodes for producing a region of uniform electric field at right angles to an applied magnetic field for causing ions of the beam having a certain charge-to-mass ratio to follow a certain cycloidal trajectory and to be focused at a certain predetermined focal plane, means for detecting the focused ions for separating the ions according to charge-to-mass ratio, means forming a beam monitoring electrode structure for monitoring the intensity of the ion beam, the improvement wherein, said ion beam monitoring electrode structure includes ion collecting electrode structure having a beam passageway therein in alignment with the beam path and having lip portions defining opposite sides of said passageway in said monitoring electrode disposed closely overlaying both ends of said beam defining slit for intercepting a certain fraction of the ion beam passable through said slit and through the beam passageway in said monitoring electrode.

2. The apparatus of claim 1 wherein said beam defining slit and said overlaying ion collecting electrode are disposed within the interior of a common one of said ring-shaped electrodes of said array of electrodes.

3. The apparatus of claim 1 wherein said beam defining slit is defined by a pair of members spaced apart along two mutually opposed parallel marginal edges to define the width of said beam defining slit therebetween, and said ion collecting electrode comprises a conductive member overlaying one of said slit defining members in insulative relation with respect thereto and having a pair of arm portions extending over the end regions of said slit.

4. The apparatus of claim 3 including an insulative member disposed overlaying and substantially covering over said ion collecting member.

5. The apparatus of claim 3 wherein one of said slit defining members is movable toward and away from said other slit defining member which is stationary to adjust the width of said beam defining slit, and wherein said ion collecting member is disposed over said stationary slit defining member.

6. The apparatus of claim 5 wherein said stationary beam defining member is disposed on the downstream side of said beam defining slit, and means forming a conductive shield overlaying said ion collecting electrode for intercepting and dissipating the charge of ions which are returned to said shield after having passed through said beam defining slit and said ion collecting electrode.

References Cited
UNITED STATES PATENTS

| | | | |
|---|---|---|---|
| 2,221,467 | 11/1940 | Bleakney | 250—41.9 |
| 2,852,684 | 9/1958 | Payne | 250—41.9 |
| 3,233,098 | 2/1966 | Reich | 250—41.9 |

ARCHIE R. BORCHELT, Primary Examiner

S. C. SHEAR, Assistant Examiner